(12) United States Patent
Sunder et al.

(10) Patent No.: US 12,274,966 B2
(45) Date of Patent: Apr. 15, 2025

(54) FILTER DEVICE HAVING MULTIPLE CHANGEABLE FILTER SURFACES

(71) Applicant: International Business Machines Corporation, Armonk, NY (US)

(72) Inventors: Madhana Sunder, Poughkeepsie, NY (US); Allan Cory VanDeventer, Poughkeepsie, NY (US); Jay A. Bunt, Esopus, NY (US); Joyce E. Molinelli Acocella, Poughquag, NY (US); Heather Nicole Polgrean, Hopewell Junction, NY (US); Hongqing Zhang, Hopewell Junction, NY (US); Steven H. Boettcher, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 17/664,925

(22) Filed: May 25, 2022

(65) Prior Publication Data

US 2023/0381705 A1 Nov. 30, 2023

(51) Int. Cl.
*B01D 53/22* (2006.01)
*B01D 29/13* (2006.01)
(Continued)

(52) U.S. Cl.
CPC ......... *B01D 46/4227* (2013.01); *B01D 29/13* (2013.01); *B01D 29/50* (2013.01);
(Continued)

(58) Field of Classification Search
CPC .... B01D 46/4227; B01D 46/56; B01D 29/13; B01D 29/50; B01D 29/96; B01D 35/02;
(Continued)

(56) References Cited

U.S. PATENT DOCUMENTS

| 3,379,312 A | 4/1968 | Brown |
| 5,085,771 A | 2/1992 | Huang |

(Continued)

FOREIGN PATENT DOCUMENTS

| EP | 0529398 B1 | 4/1998 |
| EP | 1314653 B1 | 12/2004 |

(Continued)

OTHER PUBLICATIONS

EX50, https://www.piusi.com/usa/products/ex50-ul. Retrieved from the internet on Mar. 7, 2022.

(Continued)

*Primary Examiner* — Anthony R Shumate
(74) *Attorney, Agent, or Firm* — Kimberly Zillig

(57) ABSTRACT

A device that comprises an outer component, an inner component and a filter module. The outer component includes a first hollow cylinder, and exterior ports in sidewalls of the first hollow cylinder. The inner component is positioned coaxially within the first hollow cylinder, and includes a second cylinder, and interior ports in the second cylinder, wherein the interior fluid ports are aligned parallel to the exterior ports. The filter module includes a hollow prism positioned coaxially within the outer component and surrounding the inner component, the hollow prism comprising at least four faces configured to retain filters. The filter module also includes vanes positioned along edges connecting the at least four faces and forming seals with the first hollow cylinder. A first filter is provided on a first face, of the at least four faces, which is aligned between a pair of the interior and exterior ports.

16 Claims, 12 Drawing Sheets

(51) Int. Cl.
*B01D 29/50* (2006.01)
*B01D 29/96* (2006.01)
*B01D 35/02* (2006.01)
*B01D 35/30* (2006.01)
*B01D 37/02* (2006.01)
*B01D 46/00* (2022.01)
*B01D 46/24* (2006.01)
*B01D 46/42* (2006.01)
*B01D 46/56* (2022.01)

(52) U.S. Cl.
CPC .............. *B01D 29/96* (2013.01); *B01D 35/02* (2013.01); *B01D 35/30* (2013.01); *B01D 37/025* (2013.01); *B01D 46/0012* (2013.01); *B01D 46/24* (2013.01); *B01D 46/56* (2022.01); *B01D 2201/30* (2013.01); *B01D 2201/34* (2013.01); *B01D 2271/02* (2013.01)

(58) Field of Classification Search
CPC .. B01D 35/30; B01D 37/025; B01D 46/0012; B01D 46/24; B01D 2201/30; B01D 2201/34; B01D 2271/02
See application file for complete search history.

(56) References Cited

U.S. PATENT DOCUMENTS

| | | | | |
|---|---|---|---|---|
| 5,555,108 | A * | 9/1996 | Babbitt | G02B 5/32 359/30 |
| 8,282,825 | B2 | 10/2012 | Kent | |
| 9,387,295 | B1 * | 7/2016 | Mastri | B01D 46/0008 |
| 9,387,296 | B1 * | 7/2016 | Mastri | A61B 17/3474 |
| 10,307,703 | B1 * | 6/2019 | Dearden | B01D 46/121 |
| 11,943,901 | B1 * | 3/2024 | Adams | E04H 5/02 |
| 12,193,630 | B2 * | 1/2025 | Guengant | A47L 9/009 |
| 2003/0090822 | A1 * | 5/2003 | Richards | G02B 5/20 359/885 |
| 2004/0104159 | A1 | 6/2004 | Terrazas Benavides | |
| 2005/0207035 | A1 * | 9/2005 | Nagao | G02B 6/0053 359/831 |
| 2005/0263682 | A1 * | 12/2005 | Eikenberry | G01J 3/36 250/216 |
| 2010/0011721 | A1 * | 1/2010 | Gruber | B01D 46/60 55/482 |
| 2017/0144109 | A1 * | 5/2017 | Powell | B01D 67/0046 |
| 2018/0078881 | A1 * | 3/2018 | Suzuki | B29C 33/42 |
| 2018/0126650 | A1 * | 5/2018 | Murphree | B08B 5/04 |
| 2019/0076757 | A1 | 3/2019 | Stiles, Jr. | |
| 2019/0249320 | A1 | 8/2019 | Shigeta | |
| 2023/0055557 | A1 * | 2/2023 | McEverett | B01D 36/001 |

FOREIGN PATENT DOCUMENTS

| | | |
|---|---|---|
| EP | 2896444 A1 | 7/2015 |
| GB | 2371246 B | 6/2005 |
| JP | 2013150947 A | 8/2013 |
| WO | 2018043036 A1 | 3/2018 |

OTHER PUBLICATIONS

Exquisite Adhesive Sew 'N Wash, https://www.shop.dzgns.com/collections/stabilizers/products/exquisite-adhesive-sew-n-wash?variant=29444705747013. Retrieved from the internet on Mar. 7, 2022.

Linear Springs, LS Series, Smalley Steel Ring Company, https://www.smalley.com/sites/default/files/pdfs/LS-2013.pdf, Retrieved from the internet on Mar. 7, 2022.

Polyhedra and Prisms, https://www.mathsteacher.com.au/year7/ch09_polygons/06_polyhedra/prism.htm. Retrieved from the internet on Mar. 7, 2022.

Water Soluble Pouches—Dissolving Pouches—SmartSolve, https://www.smartsolve.com/water-soluble-pouches. Retrieved from internet on Mar. 7, 2022.

* cited by examiner

300

Providing a filter device comprising:
    an outer component, including
        a first hollow cylinder, and
        exterior ports in sidewalls of the first hollow cylinder;
    an inner component positioned coaxially within the first hollow cylinder, and including
        a second cylinder, and
        interior ports in the second cylinder, wherein the interior fluid ports are aligned parallel to the exterior ports; and
    a filter module, including
        a hollow prism positioned coaxially within the outer component and surrounding the inner component, the hollow prism comprising at least four faces configured to retain filters,
        vanes positioned along edges connecting the at least four faces and forming seals with the first hollow cylinder, and
        a solid shaft connected to an end of the filter module,
wherein a first filter provided on a first face of the at least four faces is aligned between a pair of the interior and exterior ports.

310

Turning the solid shaft to rotate the filter module so that the first filter moves out of the alignment between the pair of interior and exterior ports and a second filter from a second face of the at least four faces is aligned between the pair of interior and exterior ports.

FILTER DEVICE HAVING MULTIPLE CHANGEABLE FILTER SURFACES

BACKGROUND

The present disclosure relates generally to filter systems, and more particularly to a device that can include more than one filter (i.e., multiple filters) wherein one filter at a time can be placed in a fluid flow or an air flow in a filter system.

There are many methods for capturing particulate matter suspended in a fluid or a gas as it passes through piping or tubing. To accomplish capture of particulate matter, a filter apparatus is placed at the input end, the output end, or in-line with the piping or tubing between its influent and effluent ends.

SUMMARY

According to some embodiments of the disclosure, there is provided a device that comprises an outer component, an inner component and a filter module. The outer component includes a first hollow cylinder, and exterior ports in sidewalls of the first hollow cylinder. The inner component is positioned coaxially within the first hollow cylinder, and includes a second cylinder, and interior ports in the second cylinder, wherein the interior fluid ports are aligned parallel to the exterior ports. The filter module includes a hollow prism positioned coaxially within the outer component and surrounding the inner component, the hollow prism comprising at least four faces configured to retain filters. The filter module also includes vanes positioned along edges connecting the at least four faces and forming seals with the first hollow cylinder. A first filter is provided on a first face, of the at least four faces, which is aligned between a pair of the interior and exterior ports.

According to some embodiments of the disclosure, there is provided a device that comprises an outer component, an inner component and a filter module. The outer component includes a first hollow cylinder, and exterior fluid ports in sidewalls of the first hollow cylinder. The inner component positioned coaxially within the first hollow cylinder, and includes a second cylinder, and interior fluid ports in the second cylinder, wherein the interior fluid ports are aligned parallel to the exterior fluid ports. The filter module includes a hollow prism positioned coaxially within the outer component and surrounding the inner component, the hollow prism comprising at least four faces configured to retain a fluid soluble material. The filter module also includes spring loaded vanes positioned along edges connecting the at least four faces and forming seals with an inner surface the first hollow cylinder. The fluid soluble material is provided on a first face, of the at least four faces, which is aligned between a pair of the interior and exterior fluid ports.

According to some embodiments of the disclosure, there is provided a method. The method includes an operation of providing a filter device. The filter device comprises an outer component, an inner component and a filter module. The outer component includes a first hollow cylinder, and exterior ports in sidewalls of the first hollow cylinder. The inner component is positioned coaxially within the first hollow cylinder, and includes a second cylinder, and interior ports in the second cylinder, wherein the interior fluid ports are aligned parallel to the exterior ports. The filter module includes a hollow prism positioned coaxially within the outer component and surrounding the inner component, the hollow prism comprising at least four faces configured to retain filters. The filter module also includes vanes positioned along edges connecting the at least four faces and forming seals with the first hollow cylinder, and a solid shaft connected to an end of the filter module. A first filter is provided on a first face, of the at least four faces, which is aligned between a pair of the interior and exterior ports. Another operation of the method is turning the solid shaft to rotate the filter module so that the first filter moves out of the alignment between the pair of interior and exterior ports, and a second filter from a second face of the at least four faces is aligned between the pair of interior and exterior ports.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 15 is a flow diagram of a process of using a device having multiple changeable filter surfaces, in accordance with embodiments of the disclosure.

Figure 1:
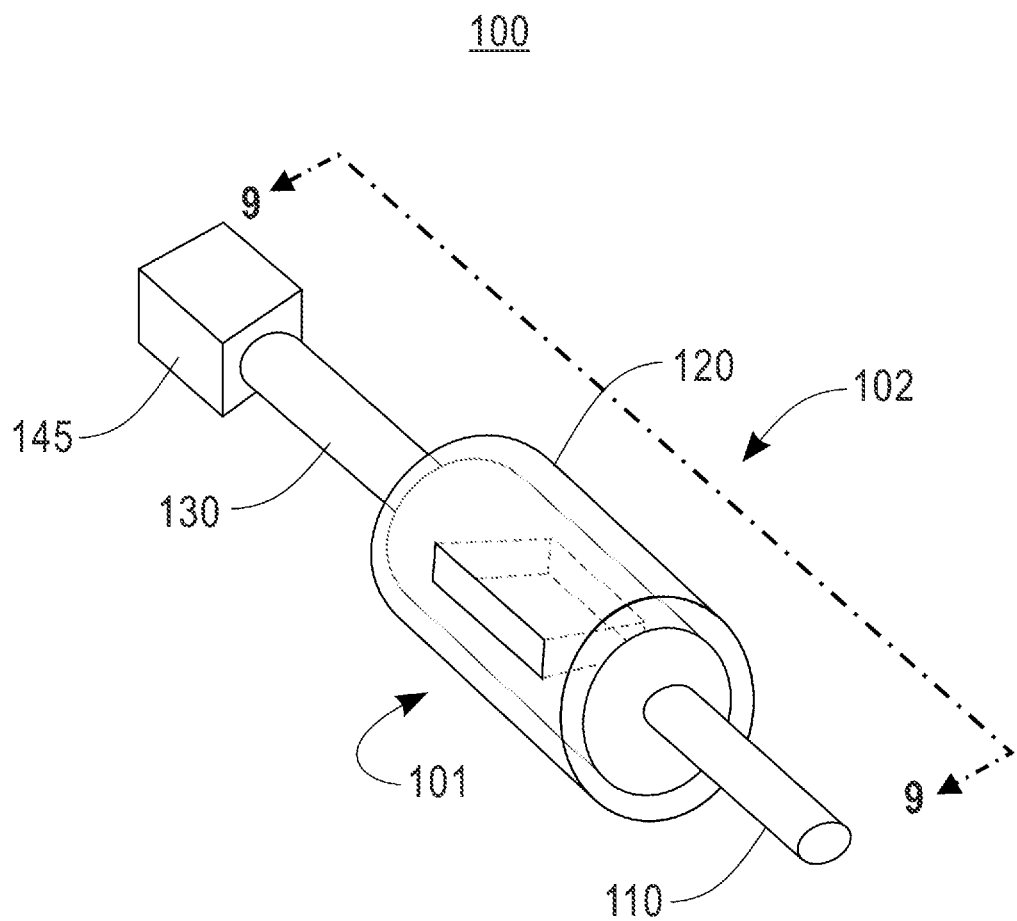
FIG. 1 is a perspective view illustrating a filter device, in accordance with embodiments of the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate generally to filter systems, and more particularly to a device that can include more than one filter (i.e., multiple filters) wherein one filter at a time can be placed in a fluid flow or an air flow in a filter system. While the present disclosure is not necessarily limited to such applications, various aspects of the disclosure can be appreciated through a discussion of various examples using this context.

Embodiments of the present disclosure relate to a device that can include more than one filter (i.e., multiple filters) wherein one filter at a time can be placed in a fluid flow or an air flow in a filter system. The one filter can be changed out easily with another filter by rotating a component including the multiple filters without requiring removal of the device from the filter system. The device of these embodiments can be used to filter a fluid (e.g., water, and grease), or a gas (e.g., air), for example. Other embodiments of the present disclosure relate to a device that can include more than one fluid soluble pouch (i.e., multiple fluid soluble pouches) wherein one fluid soluble pouch can be changed out easily with another fluid soluble pouch by rotating a component including the multiple fluid soluble pouches and without requiring removal of the device from a corresponding system. The device of these embodiments can be used to continuously dose fluid in the system with a chemical, for example. Some embodiments of the device can be compact and applicable for use in small spaces and some embodiments can be utilized in large capacity devices.

One feature and advantage of disclosed devices and processes is that they can function in an uninterrupted fashion by allowing a currently used filter or fluid soluble pouch to be seamlessly removed and replaced with a fresh filter or fluid soluble pouch. Another feature and advantage of disclosed devices and processes is that a fresh, unfouled or unused filter or unused fluid soluble pouch can be provided, to replace a used one, with minimal fluid or air flow disruption or interruption. Yet another feature or advantage of some embodiments is the device or process can seamlessly provide a change from a filter having one filtering capability and characteristic to a filter having a different filter capability and characteristic as desired. A further feature or advantage of some embodiments is the device or process can seamlessly provide a change from a fluid soluble pouch having a certain chemical or concentration of a chemical to a fluid soluble pouch having different chemical characteristics as desired. Another feature or advantage is that multiple fluid soluble pouches or membranes containing chemicals can be swapped out to introduce chemicals into a closed or open fluid loop seamlessly after a given amount of time. The fluid soluble pouches can be easily changed out, which can result in a controlled release of chemicals via membrane solubility that can enable long-term dosing rather than bulk dosing in a corresponding system.

Figure 2:
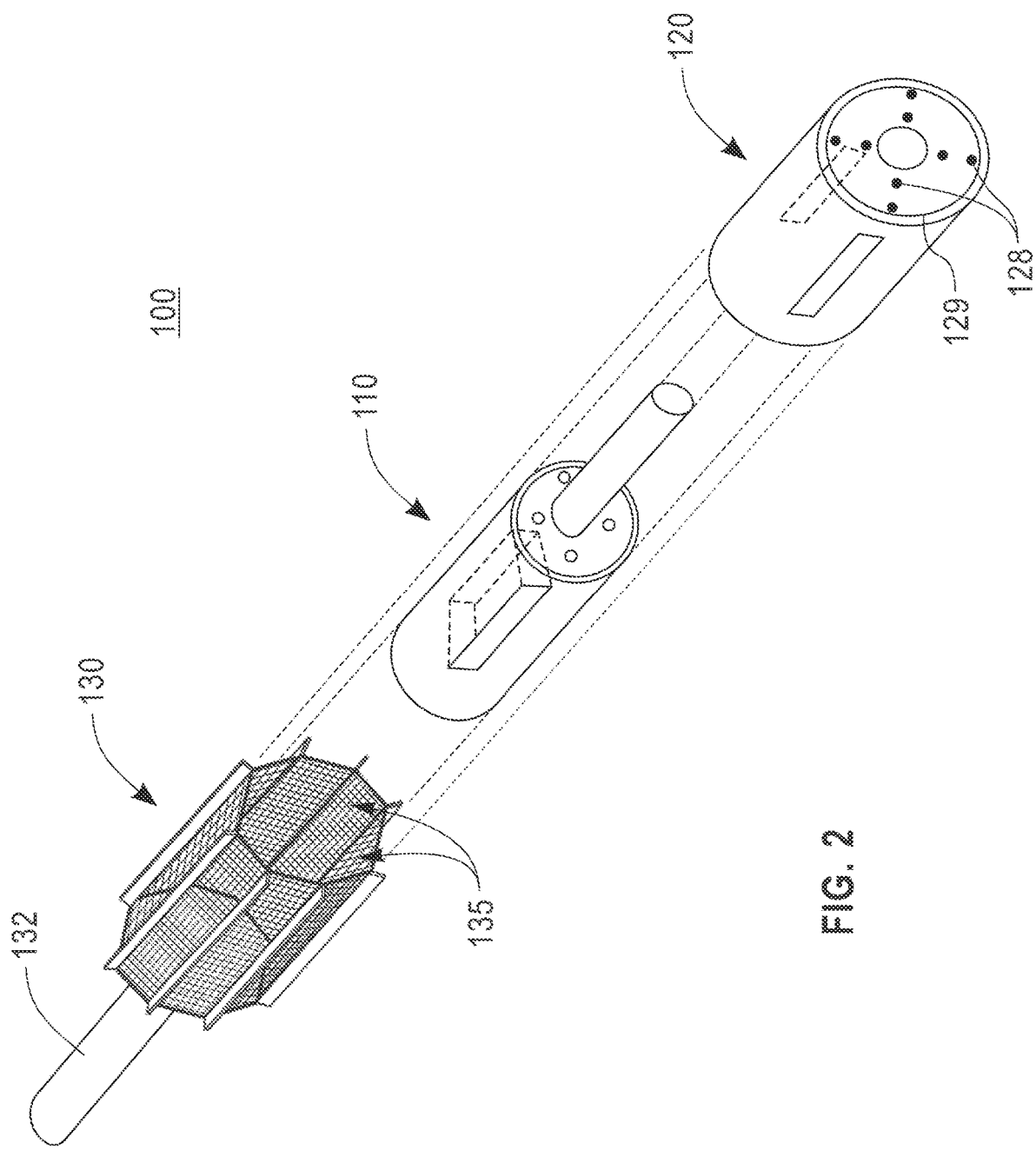
FIG. 2 is an exploded view of the filter device of FIG. 1, illustrating certain components in ghost outline, in accordance with embodiments of the disclosure.

Turning to the figures, FIG. 1 is a perspective view illustrating a filter device 100, in accordance with embodiments of the disclosure. In FIG. 1, the filter device 100 is shown assembled. FIG. 2 is an exploded view of the filter device 100. The filter device 100 is comprised of an inner cylindrical component 110, an outer cylindrical component 120, and a filter module component 130 that is located between the inner cylindrical component 110 and the outer cylindrical component 120, in a co-axial arrangement. The outer cylindrical component 120 can function as an outer housing of the filter device 100, which can contain the other components. Although generally cylindrically-shaped, it is contemplated that other suitable shapes of the components of the filter device 100 can be used, such as spheres or other shapes.

For purposes of description herein, the terms "upper," "lower," "top," "bottom," "left," "right," "rear," "front," "vertical," "horizontal," and derivatives thereof shall relate to the devices as oriented in the figures. However, it is to be understood that the devices can assume various alternative orientations and step sequences, except where expressly specified to the contrary. It is also to be understood that the specific devices and processes illustrated in the attached drawings, and described in the following disclosure, are simply exemplary embodiments of the inventive concepts defined in the appended claims. Hence, other physical characteristics relating to the embodiments disclosed herein are not to be considered as limiting, unless the claims expressly state otherwise.

Figure 3:
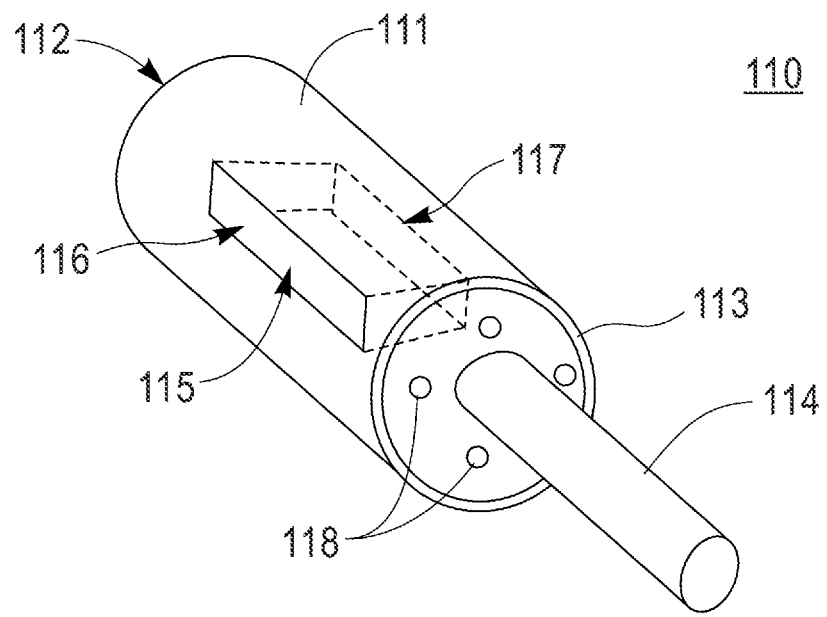
FIG. 3 is a perspective view of an inner cylindrical component of the filter device of FIGS. 1-2, illustrating certain components in ghost outline, in accordance with embodiments of the disclosure.

FIG. 3 is a perspective view of the inner cylindrical component 110 of the filter device 100 of FIGS. 1-2, illustrating certain components in ghost outline. The inner cylindrical component 110 includes a cylindrical body portion 111 comprised of a rigid material. The cylindrical body portion 111 includes a first end 112 that can be inserted into the filter module component 130 as shown in FIG. 2, and a second end 113. The second end 113 can be attached to a shaft 114 that can extend through an opening 124 (discussed below with regard to FIG. 4) in the outer cylindrical component 120, as shown in FIG. 2. The shaft 114 can be used to keep the inner cylindrical component 110 and the outer cylindrical component 120 stationary with respect to each other. The inner cylindrical component 110 can also include a fluid conduit 115 through which a fluid (or air in an air filter) can flow through the filter device 100 from an inlet opening 116 that aligns with an inlet (or "in port") side 101 of the filter device 100 (see FIG. 1) to an outlet opening 117 that aligns with an outlet (or "out port") side 102 (see FIG. 1). The shape of the inlet and outlet openings 116, 117 is shown as generally rectangular, although other shapes are also contemplated. The inner cylindrical component 110 can also include threaded holes 118 on the second end 113 that can be used to accept fasteners (not shown) that can extend through the outer cylindrical component 120 in order to attach the inner and outer cylindrical components 110, 120 together. Any suitable number and arrangement of threaded holes 118 are contemplated by the disclosure.

Figure 4:
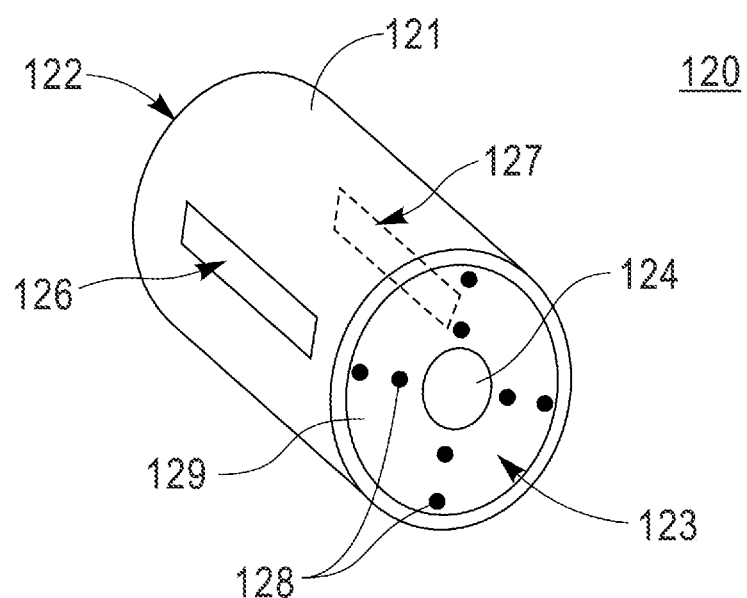
FIG. 4 is a perspective view of an outer cylindrical component of the filter device of FIGS. 1-2, illustrating certain components in ghost outline, in accordance with embodiments of the disclosure.

FIG. 4 is a perspective view of the outer cylindrical component 120, or outer housing component, of the filter device 100 of FIGS. 1-2, illustrating certain components in ghost outline. The outer cylindrical component 120 includes a cylindrical or tubular body portion 121 that is hollow inside and comprised of a rigid material. The cylindrical body portion 121 includes a first end 122 that can accept insertion of the filter module component 130 during assembly (see FIG. 2). The first end 122 can include a back side outer cover (not shown) that can serve to close or enclose the filter device 100 once assembly of the other components is complete. The cylindrical body portion 121 includes a second end 123 that can include a front side outer cover 129 that can include fasteners 128 that can be threaded into threaded holes 118 in the inner cylindrical component 110 (see FIG. 2) to attach the inner cylindrical component 110 to the outer cylindrical component 120. Other suitable attachment means for attaching the inner and outer cylindrical components 110, 120 are also contemplated by the disclosure. The front side outer cover 129 can also include an opening 124 through which the shaft 114 of the inner cylindrical component 110 can extend when the device 100 is assembled (see FIG. 2). The outer cylindrical component 120 also includes an inlet opening 126 that aligns with the inlet (or "in port") side 101 of the filter device 100 (see FIG. 1) and an outlet opening 117 that aligns with the outlet (or "out port") side 102 of the filter device 100 (see FIG. 1), in order to allow fluid or air to flow through the outer cylindrical component 120 to other components of the filter device 100.

Figure 5:
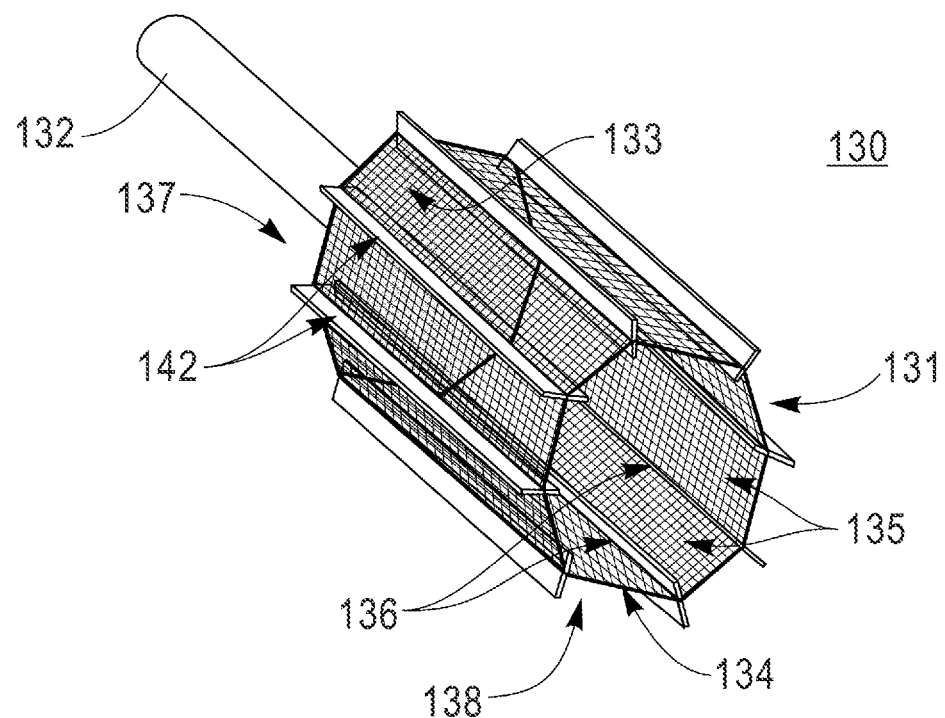
FIG. 5 is a perspective view of a filter module component of the filter device of FIGS. 1-2, in accordance with embodiments of the disclosure.

FIG. 5 is a perspective view of the filter module component 130 of the filter device 100 of FIGS. 1-2. The filter module component 130 can comprise a filter holder portion 131 that can be a hollow prism positioned coaxially within the outer component 120 and surrounding the inner component 110. The filter holder portion 131 can comprise at least four faces configured to retain filters, for example. The filter holder portion 131 can be is attached to an endplate 133 that attaches to a shaft 132. Other suitable configurations are also contemplated to attach the shaft 132 to the filter holder portion 131. The filter holder portion 131 can include a frame 134 that includes multiple frame sides 136. The filter module component 130 can also include multiple filters 135 extending across (or spanning) spaces or openings between the frame sides 136 of the frame 134. Also, a vane 142 can be attached on an outer side of one or more frame sides 136. The vanes 142 will be discussed in more detail below with regard to FIGS. 8A-8B.

The filter holder portion includes a first end 137 attached to the endplate 133, which is attached to the shaft 132. The filter holder portion 131 can also include a second end 138 that is open for insertion into the outer cylindrical component 120 and surrounding the inner cylindrical component 110 (see FIG. 2). The first and second ends 137, 138 can have corresponding shapes to provide a cross-sectional shape of the frame in order to provide a desired number of outer faces or surfaces for an inclusion of a desired number of filters 135 (or fluid soluble pouches or membranes). For example, in FIG. 5, the frame portion 131 is shaped in an octagonal shape to include eight (8) frame openings that can house or hold eight (8) filters 135 around a periphery and positioned on different faces of the filter module component 130. Other shapes are also contemplated to provide different numbers of filters.

Some non-limiting examples of filter types that can be used for the filter surfaces include carbon filters, grease filters, air filters, oil filters, etc. The filter surfaces can be made of flat face filters, or other suitable filter designs.

The filter device can be used to filter particulates in water-cooled loops for computer servers, chillers, etc., for example. The ability to change out the filter surfaces in water-cooled loops enables the loop to have continuity in case a filter clog necessitates a filter surface change. In addition, for computer servers, the filter device can be used for automated filter surface changes in an access-restricted data center, for example.

The filter device can alternatively be used to filter air, such as in a computer server. A change of a filter surface can be used in such an active air filter to provide a fresh chemically active surface.

Figure 6:
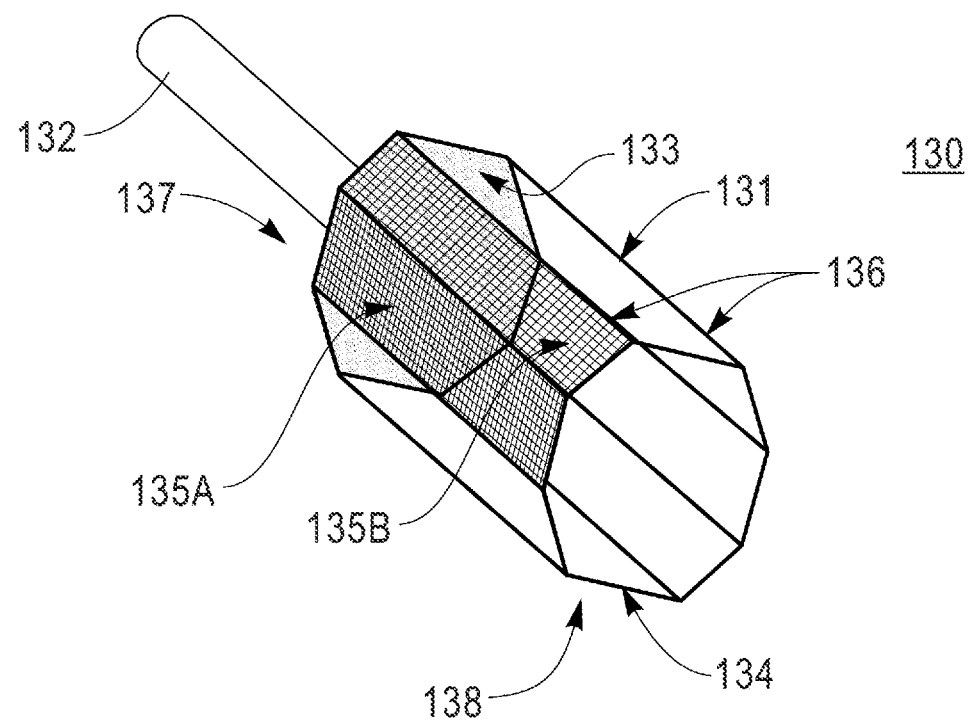
FIG. 6 is a perspective view of a filter module component of the filter device of FIG. 1, in accordance with embodiments of the disclosure.

Filter mesh sizes ranging from, for example, 10 to 100 microns can be used for the multiple filters 135 in the filter device 100. In some embodiments, filters 135 having different mesh sizes can be included in the frame 134 of the filter module component 130 in order to provide for a choice of sizes. Such a variety of choice of sizes of filters can be seamlessly utilized for filtering particulates having different sizes without disrupting fluid or air flow. FIG. 6 shows an example of the filter module component 130 with a first filter 135A having a given mesh size, and a second filter 135B having a different mesh size.

Multiple filters 135 inserted into the filter module component 130 can have the same characteristics, such as in terms of materials, make up, functionality, mesh size, pore size, etc. In another embodiment, opposite pairs of filters 135 having the same characteristics can be present in the filter module component 130. In yet another embodiment, each filter 135 can be different from the other filters in one filter module component 130. In some embodiments, some of the filter positions or spaces in the filter module component 130 can be empty.

In another example embodiment, instead of filters 135 being used in the filter device 100, fluid soluble pouches, meshes or membranes 139 can be included. The device 100, rather than being a filter device, can be a chemical dosing device, for example. All discussions of the device 100 and device 200 (in FIG. 10) herein can alternatively be used with filters and fluid-soluble pouches either for filtering or fluid dosing. Such a device 100 can be capable of releasing a single chemical or multiple ones in a closed or open fluid flow loop.

Fluid soluble pouches 139, for example, can span at least a portion of openings between sides 135 in the frame 134. Fluid soluble pouches 139 can comprise a non-soluble insert section and a fluid soluble section, in the form of a sealed pouch, for example. The fluid soluble pouch 139 can contain a dry chemical, or some other soluble material, which is intended to be released. One fluid soluble pouch 139, for example, which includes at least one soluble section, can be inserted in at least one face of the frame 134 of the device 100. If only a portion of the fluid soluble pouch 139 is soluble, then the remaining portions can keep the remainder of the fluid soluble pouch suspended in the frame 134 even after the soluble section has dissolved. The frame 134 can include two sections of frame 134, for example that snap together to form a single frame 134 that holds a fluid soluble pouch 139 in place between the two sections of frame 134. Such a snap-on frame design can be utilized to enable easy attachment of fluid soluble pouches to filter frames. The fluid soluble pouches 139 can be positioned either vertically or horizontally with respect to the frame 134. Single or multiple fluid soluble pouches 139 can be utilized on the same frame 134. In some instances, the outer walls of some of the fluid soluble pouches 139 can be designed to be thicker than the others, in order to enable a sequential or delayed release of chemicals.

Figure 7A:
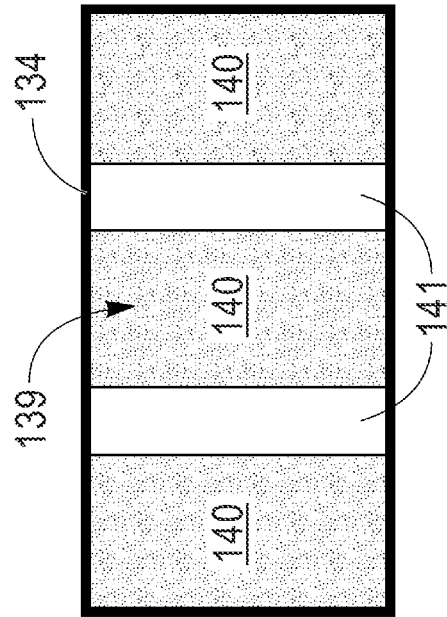
FIGS. 7A-7D are schematic representations of example fluid soluble pouch configurations, in accordance with embodiments of the disclosure.
Figure 7B:
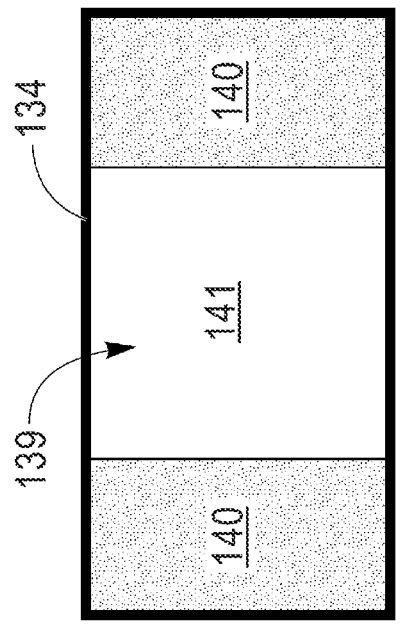
Figure 7C:
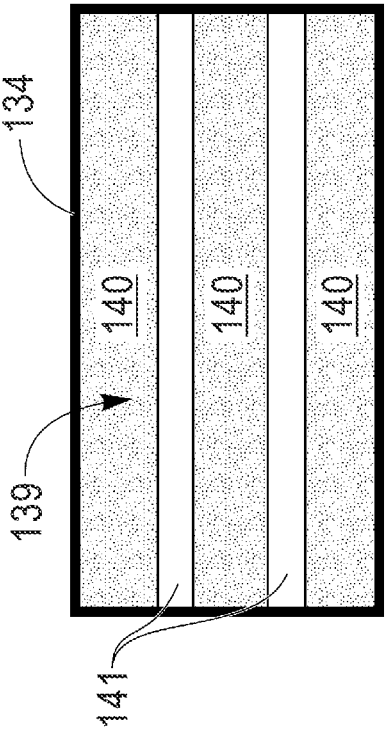
Figure 7D:
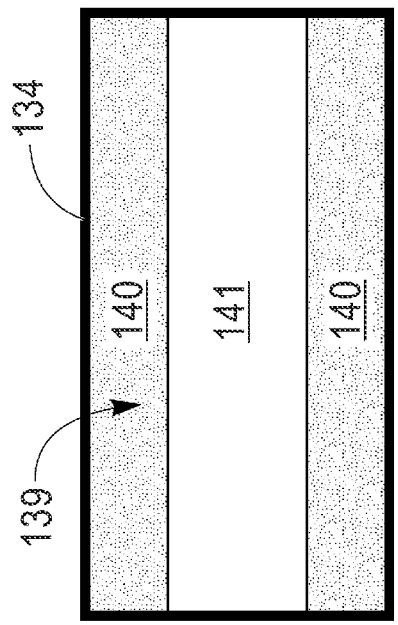

Examples of some possible fluid soluble pouch configurations are shown in FIGS. 7A-7D. FIG. 7A shows fluid soluble pouch 139 that includes two (2) soluble portions 140 towards the right and left sides, and one non-soluble portion 141 in the center. The non-soluble portion 141 can be comprised of a mesh, for example. Alternatively, the non-soluble portion 141 could be left open with no material spanning the frame 134 in that area. FIG. 7B shows an embodiment that includes three (3) soluble portions 140 and two (2) non-soluble portions 141, which alternate in arrangement, with all of the portions being vertically arranged with respect to each other. FIG. 7C shows an example in which two (2) soluble portions 140 are arranged toward the top and bottom of the frame 134 and a non-soluble portion 141 is located in the center or middle. The portions in FIG. 7C are shown horizontally arranged. FIG. 7D shows an example in which three (3) soluble portions 140 alternate with two (2) non-soluble portions 141, with all of the portions being horizontally arranged. The configurations shown in the fluid soluble pouches 139 of FIGS. 7A-7D are examples and other configurations are also contemplated by the disclosure.

The fluid soluble pouches 139 can include membranes and chemicals configured to dissipate or dissolve in a fluid loop, for example. A timed chemical release of, for example, anti-corrosive chemicals, or biocides, can be made to a fluid loop. The soluble portions 140, of fluid soluble pouches 139, can include a chemical in a dry powder form being enclosed in a mesh or other material capable of holding the dry powder in place. Other suitable examples of substances that can be included in fluid soluble pouches 139 are also contemplated by the disclosure.

Referring back to FIG. 5, the vanes 142 of the filter module component 130 are configured to ensure a water/air-tight seal between the filter module component 130 and both the inner and outer cylindrical components 110, 120 (see FIG. 2). As shown, the vanes 142 extend from the frame sides 136 that are on both sides of one of the filters 135 (or fluid soluble pouch 139, if included instead of the filter 135). The vanes 142 allow the fluid or air to move into the inlet side 101 of the filter device 100, through the outer cylindrical component 120, through the filter 135 of the filter module component 130, through the inner cylindrical component 110, and out the outlet side 102 of the filter device 100. The vanes 142 direct the air or fluid flow through the filter 135 and also prevent leakage around the filter 135.

Figure 8A:
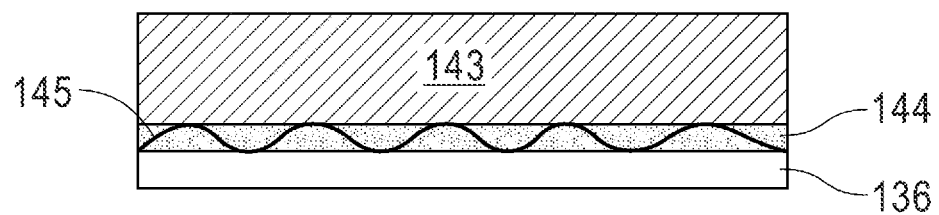
FIG. 8A is a close-up view of a portion of a vane of a filter module component of FIG. 1, in accordance with embodiments of the disclosure.
Figure 8B:
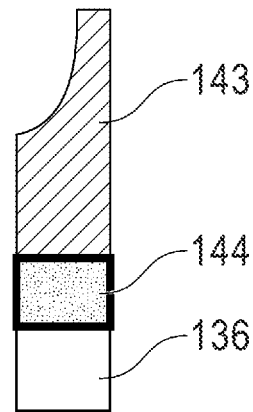
FIG. 8B is an end view of the vane of FIG. 8A, in accordance with embodiments of the disclosure.

FIG. 8A shows a close-up view of a portion of one of the vanes 142 attached to a portion of one of the frame sides 136. The vane 142 shown includes a vane body portion 143 and a spring portion 144, which can include a linear spring 145 extending therethrough, for example. FIG. 8B shows an end view of the vane 142 of FIG. 8A. The vane body portion 143 can include a tapered end, as shown. The vane body portion 143 can be comprised of a pliable material that allows the tapered end to stay in contact with an inner circumference of the outer cylindrical component 120 or the outer circumference of the inner cylindrical component 110. The linear spring 145 allows the vane body 143 to have some compliance or movement and also provides force to keep the vane body portion 143 in contact with the inner or outer cylindrical components 110, 120. In one embodiment, notches 151 (see FIG. 9, discussed below) can be available on an inner surface of the outer cylindrical component 120 for securing spring-loaded vanes 142. This is to ensure that the filter 135 being utilized is parallel to the fluid inlets and outlets positioned in the inner and outer cylindrical components 110, 120. It is contemplated that other suitable design of vanes can be provided in the device 100.

FIG. 2 illustrates how the components of FIGS. 3-5 can be arranged or assembled to form the filter device 100. As shown in FIG. 2, the inner cylindrical component 110 can be positioned inside the filter module component 130, and the filter module component 130 containing the inner cylindrical component 110 can then be positioned inside the outer cylindrical component 120. The components 110, 120, 130 are co-axially arranged. When the filter device 100 is assembled, the inner and outer cylindrical components 110, 120 are static. The outer cylindrical component 120 as shown is generally hollow. The inner cylindrical component 110 can comprise of both solid and hollow elements. The inner and outer cylindrical components 110, 120 include inlet openings 116, 126 and outlet openings 117, 127, respectively, that are parallel to each other and allow the entry and exit of fluid or air through the filter device 100. The inlet and outlet openings 116, 126, 117, 127 can have any suitable shape or form. The fluid conduit 115 in the inner cylindrical component 110 can provide an enclosed path for fluid or air to flow through the device 100. The shaft 114 shown is solid and extends from the assembled filter device 100, and is configured to keep the inner cylindrical component 110 stationary with respect to the remainder of the filter device 100. The outer cylindrical component 120 can be secured to the inner cylindrical component 110 using front side outer cover 129, back side outer cover (not shown), and fasteners 128. The shaft 132 of the filter module component 130 is configured to be rotated in order to place one of the multiple filters 135 on the filter module component 130 in the air or fluid flow of the filter device 100 or to switch to another filter 135 in order to expose the other filter 135 to the air or fluid flow. Alternatively, the filters 135 can be replaced with fluid soluble pouches 139 (such as in FIGS. 7A-7D), for example.

Figure 9:
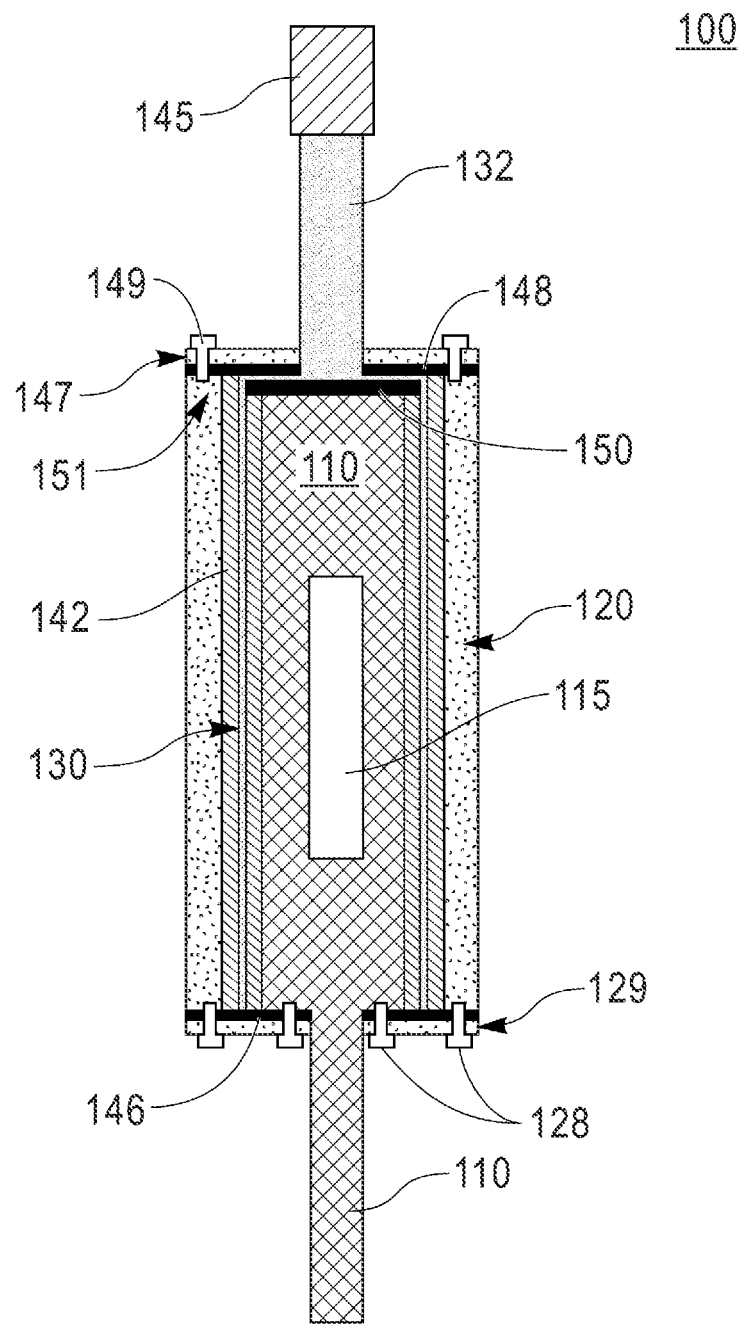
FIG. 9 is a cross-sectional view of the filter device of FIG. 1, in accordance with embodiments of the disclosure.

The disclosure contemplates using different external mechanisms in order to rotate the shaft 132 of the filter module component 120 in order to expose a certain filter 135 (or fluid soluble pouch 139) to fluid or air flow. For example, the shaft 132 can be operated by a manual mechanism. FIG. 9 includes a filter position selection unit 145 that can be located on the end of shaft 132 in order to keep track of rotation of the shaft 132 attached to the filter module component 130. Visible markings can be available for indicating corresponding filter 135 (or fluid soluble pouch 139) positions. Another manual mechanism used to rotate the filter module component 130 can be, for example, a hand crank. Additional mechanisms, such as a ratchet, can also be utilized to ensure that the desired filter 135 remains parallel to the inlet and outlet openings 116, 117 following a filter position change.

Another embodiment of an external mechanism used to change out filters 135 or fluid soluble pouches 139 in the device 100, for example, can consist of a precision gear box, servo motors or other devices. The external mechanism can be activated using a sensor or series of sensors that can be responsive for monitoring a certain change in fluid flow characteristics of a system into which the device 100 is incorporated. A filter 135 or fluid soluble pouch 139 position change can be driven by a timed mechanism, for example, in some systems. In other instances, a desired filter 135 or fluid soluble pouch 139 position can be selected by an operator or an automated computer program.

In some embodiments, different input devices can be available on the filter position selection unit 145, for example for selecting a particular filter position or filter type. A user display can communicate with the filter position selection unit 145, for example, which can provide information such as a current filter 135 position, a number of unused filters, types of unused filters, a period of usage of a certain filter, etc. Fluid soluble pouches 139 can be exchanged with the filters 135 in any of the embodiments described.

A system that includes the filter device 100 can include automatic ordering functionality, for example. The filter device 100 can be capable of directly ordering replacement filters 135 or fluid soluble pouches 139 over the internet or by utilizing ethernet, wireless means such as blue tooth, Wi-Fi, or other means. The automatic ordering functionality can be activated when certain filters 135 or fluid soluble pouches 139 are completely exhausted or when a pre-set condition set by the user or manufacturer has been met. In some embodiments, a response key from the user or operator may be required prior to final order placement of a replacement filter.

FIG. 9 is a cross-sectional view of the filter device 100 of FIGS. 1-2, which is shown assembled. The figure illustrates features that may not be visible in FIGS. 1-2. For example, located on the inside of the front side outer cover 129 of the outer cylindrical component 120, there can be a front seal 146. Another feature visible is a back side cover 147 attached to the outer cylindrical component 120 by fasteners 149. In addition, located inside, and attached to, the back side cover 147 there can be a first fluid/airtight material layer 148. A second fluid/airtight material layer 150 can be located between the first end 137 (see FIG. 5) of the filter module component 130 and the first end 112 (see FIG. 3) of the inner cylindrical component 110.

The front seal 146 and the first and second fluid/airtight material layers 148, 150 can consist of a rubber or other water-tight material in order to seal both ends of the outer cylindrical component 120. The vanes 142 make physical contact with the seal 146 and the first and second fluid/airtight material layers 148, 150. These features can control the fluid or air entering the filter device 100, and can restrict the fluid or air to active areas of the filter device 100 without contaminating or leaking into other aspects of a system into which the filter device 100 is incorporated. In some embodiments, a rubber or other water-tight material coating can also be applied to an inner circumference of the outer cylindrical component 120 and/or an outer circumference of the inner cylindrical component 110.

Figure 10:
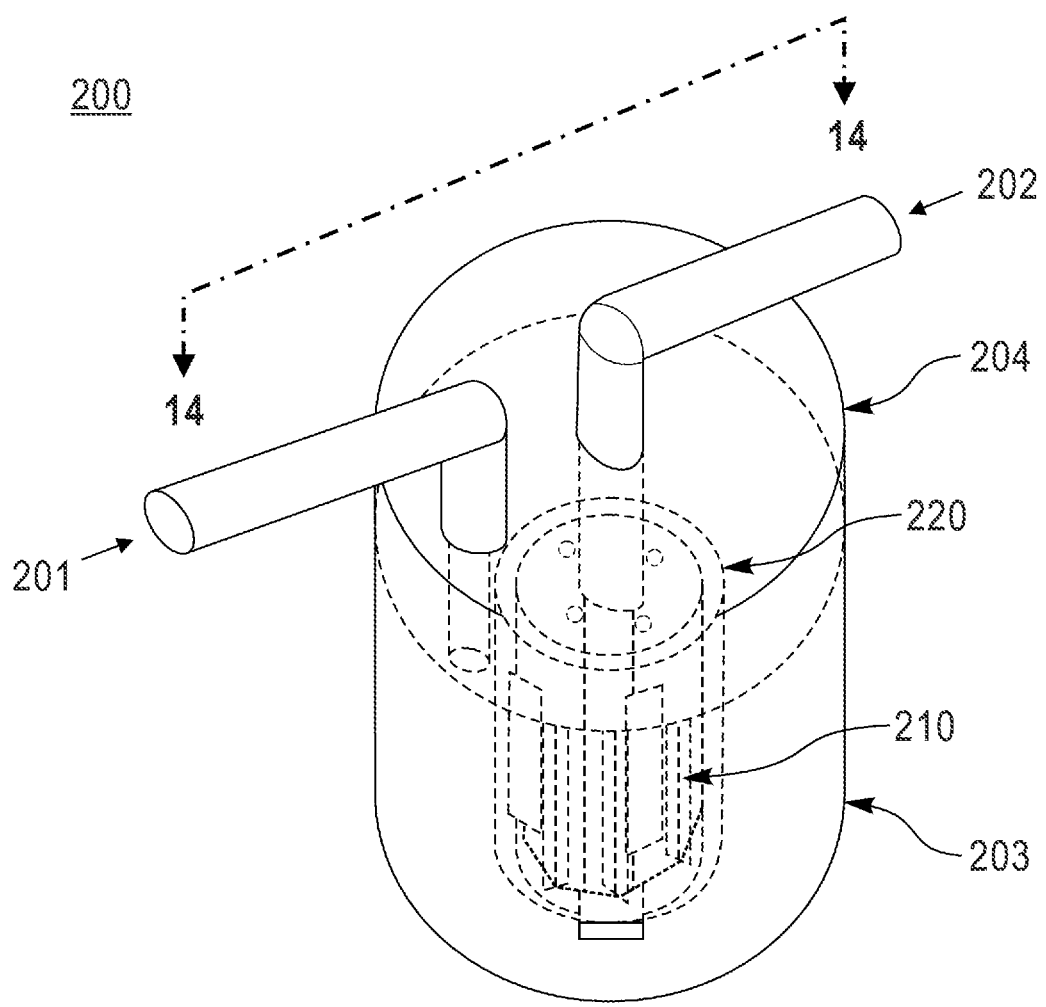
FIG. 10 is a perspective view of a filter device, illustrating certain components in ghost outline, in accordance with embodiments of the disclosure.

The filter device 100 shown in FIGS. 1-9 can have a compact size and can be used in smaller spaces, for example. FIG. 10 illustrates a large capacity filter device 200 (in partial ghost view), which is another embodiment of the present disclosure. The large capacity filter device 200 includes a fluid inlet 201 and a fluid outlet 202, that extend through a filter cap 204 that sits atop a filter housing 203. Some components are shown in ghost view in FIG. 10, which allows a view of an inner cylindrical component 210 and an outer cylindrical component 220 enclosed in the device 200. The inner and outer cylindrical components 210, 220 are similar to the inner and outer cylindrical components 110, 120 of the filter device 100 discussed above. The filter device 200 is also comprised of a filter module component 230 (not visible in FIG. 10, but is visible in FIG. 13) that is located between the inner cylindrical component 210 and the outer cylindrical component 220, in a co-axial arrangement. Although generally cylindrically-shaped, it is contemplated that other suitable shapes of the components of the filter device 200 can be used, such as spheres or other shapes.

Figure 11:
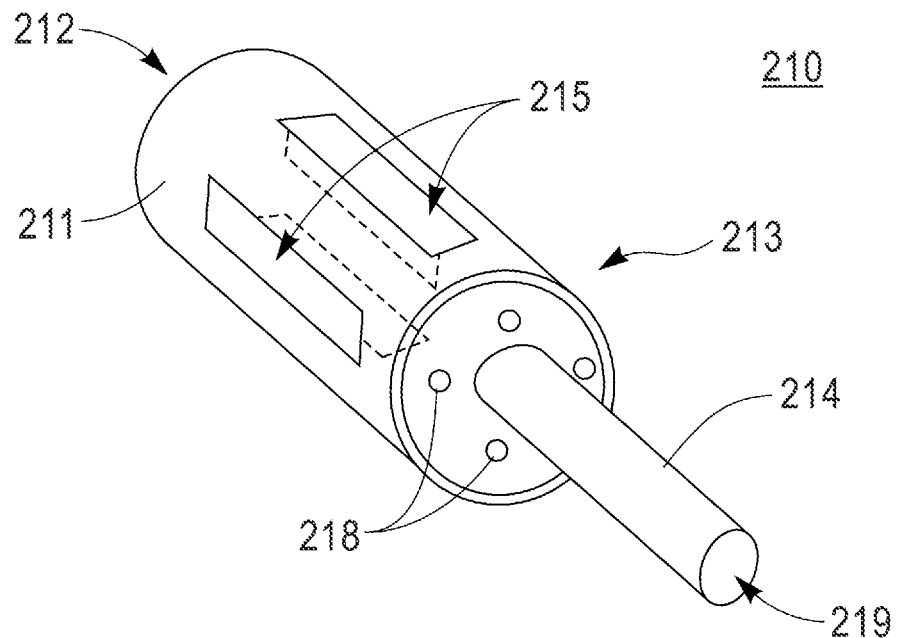
FIG. 11 is a perspective view of an inner cylindrical component of the filter device of FIG. 10, illustrating certain components in ghost outline, in accordance with embodiments of the disclosure.

FIG. 11 is a perspective view of the inner cylindrical component 210 of the filter device 200 of FIG. 10, illustrating certain components in ghost outline. The inner cylindrical component 210 includes a cylindrical body portion 211 that is shown as being generally hollow inside and comprised of a rigid material. The cylindrical body portion 211 includes a first end 212 that can be inserted into the filter module component 230 (shown in FIG. 13), and a second end 213. The second end 213 can be attached to a shaft 214 that can extend through an opening 224 (discussed below with regard to FIG. 12) in the outer cylindrical component 220 (shown in FIG. 12). The shaft 214 can be used to keep the inner cylindrical component 210 and the outer cylindrical component 220 stationary with respect to each other. The inner cylindrical component 210 also can include a plurality of inlet openings 215 (four (4) are shown) through which a fluid (or air in an air filter) can flow into the inner cylindrical component 210. The shape of the inlet openings 215 is shown as generally rectangular, although other shapes are also contemplated. The inner cylindrical component 210 can also include threaded holes 218 on the second end 213 that can be used to accept fasteners (not shown) that can extend through the outer cylindrical component 220 in order to attach the inner and outer cylindrical components 210, 220 together. Any suitable number and arrangement of threaded holes 218 are contemplated by the disclosure. The inner cylindrical component 210 shown also includes a fluid (or air if used in an air filter) outlet 219.

Figure 12:
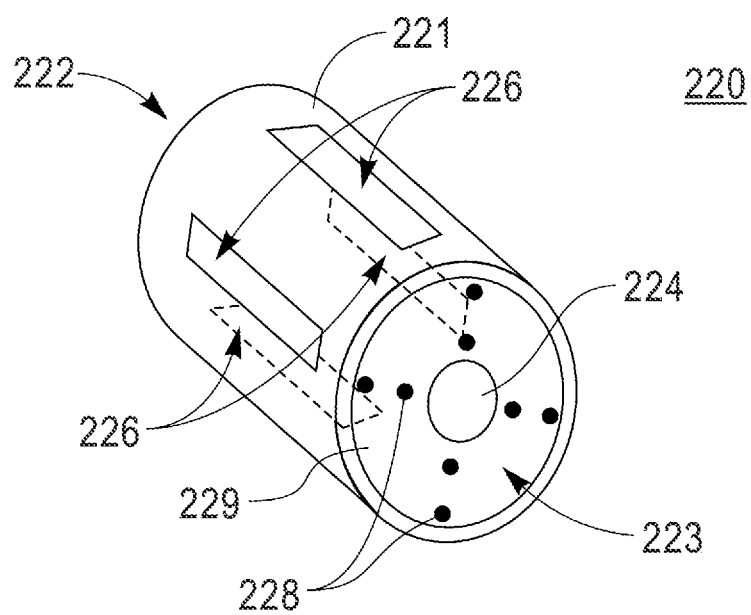
FIG. 12 is a perspective view of an outer cylindrical component of the filter device of FIG. 10, illustrating certain components in ghost outline, in accordance with embodiments of the disclosure.

FIG. 12 is a perspective view of the outer cylindrical component 220 of the filter device 200 of FIG. 10, illustrating certain components in ghost outline. The outer cylindrical component 220 includes a cylindrical or tubular body portion 221 that is hollow inside and comprised of a rigid material. The cylindrical body portion 221 includes a first end 222 that can accept insertion of the filter module component 230 (see FIG. 13) during co-axial assembly. The first end 222 can include a back side outer cover (not shown) that can serve to close or enclose the outer cylindrical component 220 once assembly of the other components is complete. The cylindrical body portion 221 includes a second end 223 that can include a front side outer cover 229 that can include fasteners 228 that can be threaded into threaded holes 218 in the inner cylindrical component 210 (see FIG. 11). Other suitable attachment means for attaching the inner and outer cylindrical components 210, 220 are also contemplated by the disclosure. The front side outer cover 229 can also include an opening 224 through which the shaft 214 of the inner cylindrical component 210 can extend (see FIG. 11). The outer cylindrical component 220 also includes a plurality (four (4) are shown) of inlet openings 226 that can be aligned with the inlet openings 215 of the inner cylindrical component 210. Other suitable numbers of inlet openings are contemplated for the outer cylindrical component 220 as well as for the inner cylindrical component 210. The inlet openings 215, 226 of both the inner cylindrical component 210 and the outer cylindrical component 220 can align or be parallel.

Figure 13:
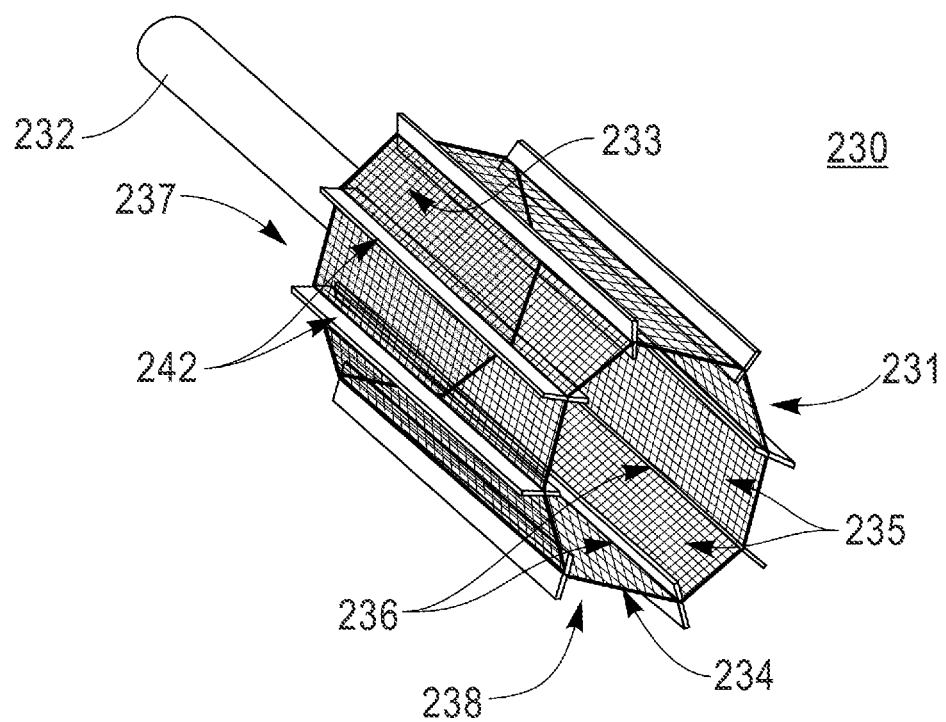
FIG. 13 is a perspective view of a filter module component of the filter device of FIG. 10, in accordance with embodiments of the disclosure.

FIG. 13 is a perspective view of the filter module component 230 of the filter device 200 of FIG. 10. The filter module component 230 can comprise a filter holder portion 231 that can be a hollow prism positioned coaxially within the outer component 220 and surrounding the inner component 210. The filter holder portion 231 can comprise at least four faces configured to retain filters, for example. The filter holder portion 231 can be attached to an endplate 233 that attaches to a shaft 232. Other suitable configurations are also contemplated to attach the shaft 232 to the filter holder portion 231. The filter holder portion 231 can include a frame 234 that includes multiple frame sides 236. The filter module component 230 can also include multiple filters 235 extending across (or spanning) spaces or openings between the frame sides 236 of the frame 234. As with filter 100 of FIGS. 1-2, for example, the filters 235 of device 200 can alternatively include fluid soluble pouches (see e.g., fluid soluble pouches in FIGS. 7A-7D) rather than filters 235. A vane 242 can be attached on an outer side and an inner side of each frame side 236. The vanes 242 can be like those in FIGS. 8A-8B, and the discussion above with regard to the vanes 142 also applies to the vanes 242 in filter device 200. Similarly, the discussions above regarding the filters 135 and the fluid soluble pouches 139 that can be incorporated into the filter device 100 also apply to the filters 235 and fluid soluble pouches (not shown) that can be incorporated into the large capacity filter device 200.

The filter holder portion 231 of filter device 200 includes a first end 237 attached to the endplate 233, which is attached to the shaft 232. The filter holder portion 231 can also include a second end 234 that is open for insertion into the outer cylindrical component 220 and surrounding the inner cylindrical component 210 (see FIG. 11). The first and second ends 237, 238 can each have a corresponding shape to provide a cross-sectional shape of the frame in order to provide a desired number of outer faces or surfaces for an inclusion of a desired number of filters 235 (or fluid soluble pouches). For example, in FIG. 13, the frame portion 231 is shaped in an octagonal shape to include eight (8) frame openings that house or hold eight (8) filters 235 around a periphery and positioned on different faces of the filter module component 230. Other shapes are also contemplated to provide different numbers of filters 235 or fluid soluble pouches.

Figure 14:
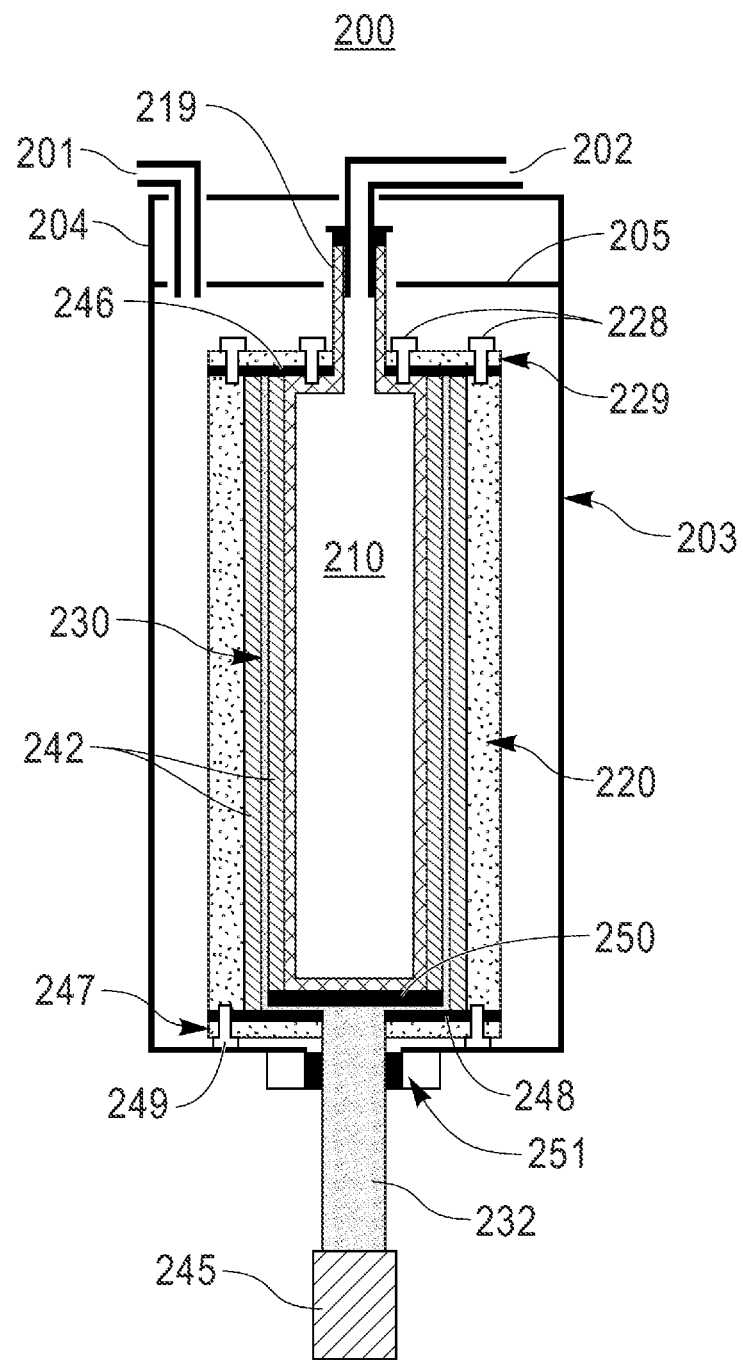
FIG. 14 is a cross-sectional view of the filter device of FIG. 10, in accordance with embodiments of the disclosure.

FIG. 14 is a cross-sectional view of the filter device 200 of FIG. 10, which illustrates how the components can be arranged or assembled to form the filter device 200. The inner cylindrical component 210 can be positioned inside the filter module component 230, and the filter module component 230 contained within the inner cylindrical component 110 can then be positioned inside the outer cylindrical component 220. When the filter device 200 is assembled, the inner and outer cylindrical components 210, 220 are static. The outer cylindrical component 220 as shown is generally hollow. The inner cylindrical component 210 is also shown as hollow. The shaft 232 of the filter module component 230 is configured to be rotated in order to place one of the multiple filters (not shown, but seen in FIG. 13) on the filter module component 230 in the air or fluid flow of the filter device 200 or to switch to another filter in order to expose the other filter to the air or fluid flow.

FIG. 14 also illustrates features that may not be visible in FIG. 10. For example, located on the inside of the front top outer cover 229 of the outer cylindrical component 220 can be a seal 246. Another feature of the outer cylindrical component 220 is a bottom outer cover 247 attached by fasteners 249. In addition, located inside, and attached to, the bottom outer cover 247 can be a first fluid/airtight material layer 248. A second fluid/airtight material layer 250 can be located between the first end 237 of the filter module component 230 and the first end 212 of the inner cylindrical component 210, for example.

The top seal 246 and the first and second fluid-airtight material layers 248, 250 can consist of a rubber or other water-tight material in order to seal both ends of the outer cylindrical component 220. The vanes 242 can make physical contact with the seal 246 and the first and second fluid/airtight material layers 248, 250. These features can control the fluid or air entering the filter device 200, and restrict the fluid or air to active areas of the filter device 200 without contaminating or leaking into other aspects of a system into which the filter device 200 is incorporated. In some embodiments, a rubber or other water-tight material coating can be applied to an inner circumference of the outer cylindrical component 220 and/or an outer circumference of the inner cylindrical component 210.

FIG. 14 shows the filter cap 204 containing the fluid inlet 201 and the fluid outlet 202 pipes, which are fluid tight. The fluid inlet 201 and the fluid outlet 202 can be connected to an external water-cooling loop piping (not shown) using either quick disconnects, brazing or other methods known in the industry. A threaded portion can be present on an outer diameter, at a lower end, of the fluid outlet 202, which can securely attach the fluid outlet 202 to an outlet (shaft 214) of the inner cylindrical component 210. An O-ring 219, for example, can be employed to ensure a fluid tight connection between the fluid outlet 202 and the shaft 214 of the inner cylindrical component 210. The fluid outlet 219 of the inner cylindrical component 210 can be attached to the fluid outlet 202 of the filter cap 204, in order to keep the inner cylindrical component 210 stationary.

The filter housing 203 can be attached to the filter cap 204 with threading, for example. O-rings and other fluid tight devices can be used to ensure a fluid tight connection between the filter cap 204 and the housing 203. A rotary lip seal 251, for example, can be attached to the bottom portion of the filter housing 203, through which the filter module component shaft 232 extends out from the bottom portion of the filter housing 203. The seal 251 can ensure a fluid tight barrier between the fluid in the housing 203 and the outside environment, and at the same time permits rotation of the shaft 232.

FIG. 14 includes a filter position selection unit 245 that can be located on the end of shaft 232 in order to keep track of rotation of the shaft 232 attached to the filter module component 230. The filter position selection unit 245 can be rotated to expose a fresh filter surface or a desired filter surface having a certain specificity. Visible markings can be available for indicating corresponding filter positions. Mechanisms for rotating, and controlling rotation of, the filter module component 230 in filter device 200 can be the same as those discussed herein above with regard to the filter device 100.

Other embodiments of the disclosure include processes of assembling and/or of using a changeable filter, or fluid dosing, device, as described above with regard to devices 100, 200. One process 300 in FIG. 15 includes an operation (310 in FIG. 15) that comprises providing a filter device comprising: an outer component, including a first hollow cylinder, and exterior ports in sidewalls of the first hollow cylinder; an inner component positioned coaxially within the first hollow cylinder, and including a second cylinder, and interior ports in the second cylinder, wherein the interior fluid ports are aligned parallel to the exterior ports; and a filter module, including a hollow prism positioned coaxially within the outer component and surrounding the inner component, the hollow prism comprising at least four faces configured to retain filters; vanes positioned along edges connecting the at least four faces and forming seals with the first hollow cylinder, and a solid shaft connected to an end of the filter module, wherein a first filter provided on a first face of the at least four faces is aligned between a pair of the interior and exterior ports. Another operation (320 in FIG. 15) comprises turning the solid shaft to rotate the filter module so that the first filter moves out of the alignment between the pair of interior and exterior ports and a second filter from a second face of the at least four faces is aligned between the pair of interior and exterior ports. The device can be configured to filter a fluid, and can further comprise: a filter housing configured to house the outer component, the inner component and the filter module; a fluid inlet configured to provide a fluid into the filter housing; and a fluid outlet configured to remove fluid from the filter housing.

Another process can involve the same operations of the process 300 described above, with the exception of fluid soluble pouches being included in the device instead of filters.

For purposes of this description, certain aspects, advantages, and novel features of the embodiments of this disclosure are described herein. The disclosed processes, and systems should not be construed as being limiting in any way. Instead, the present disclosure is directed toward all novel and nonobvious features and aspects of the various disclosed embodiments, alone and in various combinations and sub-combinations with one another. The processes, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed processes can be used in conjunction with other processes. Additionally, the description sometimes uses terms like "provide" or "achieve" to describe the disclosed processes. These terms are high-level abstractions of the actual operations that are performed. The actual operations that correspond to these terms can vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises."

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A device comprising:
   an outer component, including
      a first hollow cylinder, and
      exterior ports in sidewalls of the first hollow cylinder;
   an inner component positioned coaxially within the first hollow cylinder, and including a second cylinder, and interior ports in the second cylinder, wherein the interior fluid ports are aligned parallel to the exterior ports; and
   a filter module, including
      a hollow prism positioned coaxially within the outer component and surrounding the inner component, the hollow prism comprising at least four faces configured to retain filters, and
      vanes positioned along edges connecting the at least four faces and forming seals with the first hollow cylinder,
   wherein a first filter provided on a first face of the at least four faces is aligned between a pair of the interior and exterior ports.

2. The device of claim 1, wherein the device is configured to filter a fluid, and the exterior and interior ports are fluid ports.

3. The device of claim 1, wherein the device is configured to filter air.

4. The device of claim 1, wherein the filters comprise a mesh material.

5. The device of claim 4, wherein a second filter has a second mesh size of mesh material from a first mesh size of mesh material of the first filter.

6. The device of claim 1, wherein the vanes are spring loaded vanes and are positioned along edges connecting the at least four faces and forming seals with an inner surface the first hollow cylinder and an outer surface of the second cylinder.

7. The device of claim 1, further comprising:
   a component configured to prevent rotation of the inner component and the outer component with respect to each other.

8. The device of claim 1, further comprising:
   a solid shaft connected to an end of the filter module, wherein turning the solid shaft rotates the filter module so that the first filter moves out of the alignment between the pair of interior and exterior ports and a filter from a second face of the at least four faces is aligned between the pair of interior and exterior ports.

9. The device of claim 1, wherein the device is configured to filter a fluid, and further comprises:
   a filter housing configured to house the outer component, the inner component and the filter module;
   a fluid inlet configured to provide a fluid into the filter housing; and
   a fluid outlet configured to remove fluid from the filter housing.

10. The device of claim 9, further comprising:
    a solid shaft connected to an end of the filter module and extending outside of the filter housing, wherein turning the solid shaft rotates the filter module so that the first filter moves out of the alignment between the pair of interior and exterior ports and a filter from a second face of the at least four faces is aligned between the pair of interior and exterior ports.

11. The device of claim 9, wherein the vanes are spring loaded vanes and are positioned along edges connecting the at least four faces and forming seals with an inner surface the first hollow cylinder and an outer surface of the second cylinder.

12. The device of claim 9, wherein the filters comprise a mesh material, and a second filter has a second mesh size of mesh material from a first mesh size of mesh material of the first filter.

13. A device comprising:
    an outer component, including
       a first hollow cylinder, and
       exterior fluid ports in sidewalls of the first hollow cylinder;
    an inner component positioned coaxially within the first hollow cylinder, and including a second cylinder, and interior fluid ports in the second cylinder, wherein the interior fluid ports are aligned parallel to the exterior fluid ports; and a filter module, including
- a hollow prism positioned coaxially within the outer component and surrounding the inner component, the hollow prism comprising at least four faces configured to retain a fluid soluble material, and
- spring loaded vanes positioned along edges connecting the at least four faces and forming seals with an inner surface the first hollow cylinder, wherein the fluid soluble material provided on a first face of the at least four faces is aligned between a pair of the interior and exterior fluid ports.

14. The device of claim 13, wherein the fluid soluble material includes at least one portion of fluid soluble material and at least one portion of non-soluble material.

15. The device of claim 13, wherein the fluid soluble material is configured to release at least one chemical.

16. The device of claim 13, wherein the fluid soluble material comprises at least one sealed pouch containing a dry chemical.

\* \* \* \* \*